Patented Oct. 23, 1928.

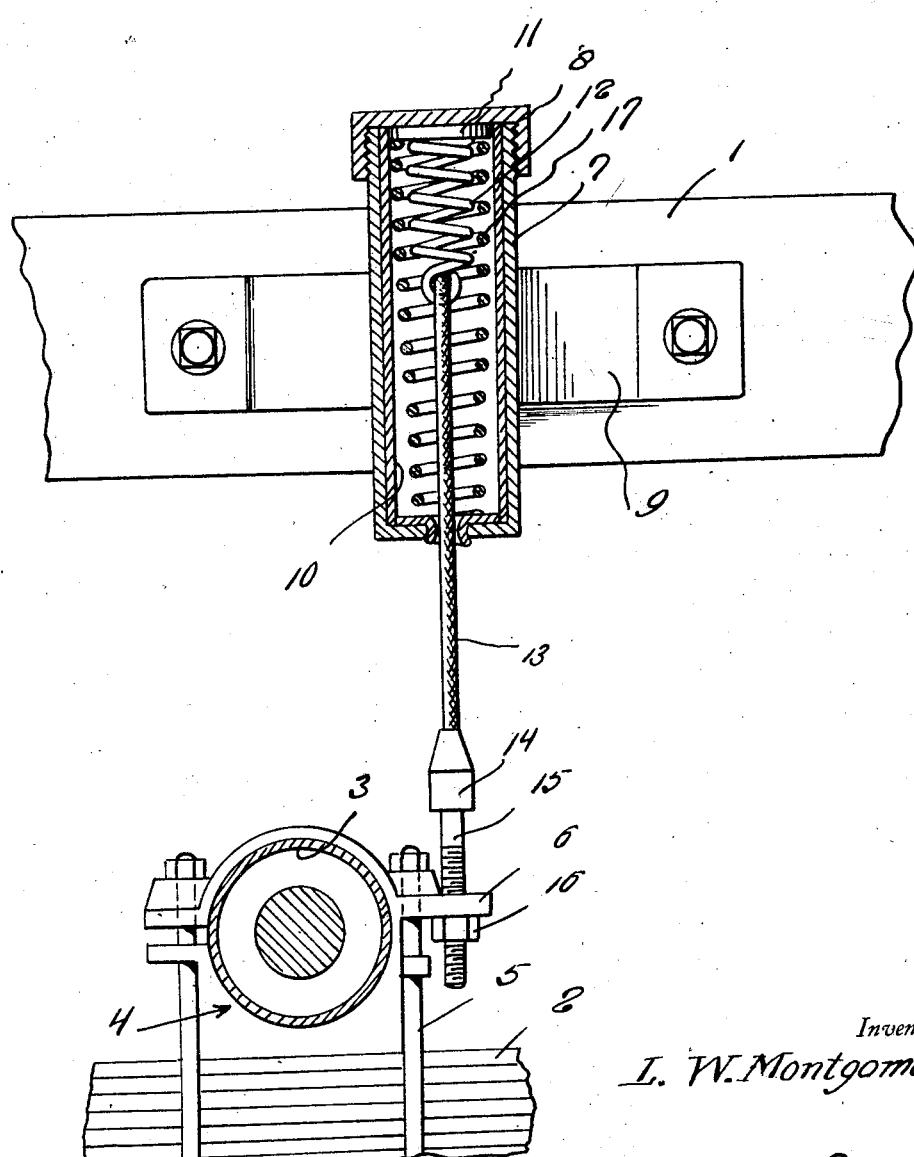

1,688,592

UNITED STATES PATENT OFFICE.

LEONARD WILMOT MONTGOMERY, OF AMARILLO, TEXAS.

AUTOMOBILE SNUBBER.

Application filed September 22, 1927. Serial No. 221,319.

The present invention relates to an improved automotive appliance known in the art as a snubber, and constructed for cooperation with the main automobile spring with a view toward increasing the efficiency thereof by preventing violent rebound, and promoting smoother operation.

My principal aim is to generally improve upon snubbers by providing one of comparative simplicity and durability, which is constructed in a manner to permit it to be applied by unskilled hands.

Other features and advantages will become apparent from the following description and drawing.

In the drawing:—

The figure represents a view in section and elevation of the improved snubber, showing it attached to the automobile frame and spring therebeneath.

Considering now the drawings in detail, it will be observed that the reference character 1 designates a frame bar and the reference character 2 a portion of an ordinary leaf spring. The rear axle housing is designated by the numeral 3. Embracing this housing is a clamp generally designated by the reference character 4, the same being designed to bear upon the spring 2. It is held in place by bolts or their equivalents 5.

It is to be noted however, that this clamp is designed to include an outstanding apertured lug 6. The snubber comprises a cylinder 7 open at its top and provided with a screw cap 8. This cylinder is mounted upon an attaching bracket 9 fastened to the frame bar 1. The cylinder is provided with an appropriate lining 10, and slidable in this lining is a longitudinally reciprocable disk 11 carrying a relatively small coiled spring 12.

Attached to the eye at the bottom of this coiled spring is a cable 13 equipped at its lower end with a head 14 carrying a bolt 15. The bolt passes through the opening in the lug 6 and is held adjustably in place by the action of the nut 16 bearing against the under side of the lug. The disk 11 bears upon the uppermost coil of a larger coiled spring, 17, located in the cylinder and bearing at its lower end against the bottom of the cylinder. This spring 17 surrounds the cable.

In operation, it is obvious that as the spring 2 moves away from the frame bar 1 an endwise pull is exerted upon the cable 13. In so doing, the disk 11 is moved downwardly against the resistance of the spring 17, and this spring together with the spring 12, serves to absorb the shock.

The advantages of a structure of this kind will be quite clear to persons skilled in the art to which the invention relates. Therefore, a more lengthy description is thought unnecessary.

Minor changes in shape, size, and rearrangement of parts, coming within the field of invention claimed, may be resorted to if desired.

Having thus described my invention, what I claim as new is:—

As a new product of manufacture, a snubber comprising an attaching bracket adapted to be rigidly mounted upon a frame bar, a vertically disposed cylinder carried by said bracket, a disk slidable in said cylinder, a spring arranged in said cylinder, and bearing at one end against the bottom of the cylinder and at its opposite end against the under side of the disk, a relatively small coiled spring connected to the disk and disposed within the first-named spring, a cable connected to said small spring and extending downwardly through an opening in the bottom of the cylinder, a bolt carried by the lower end of said cable, and an axle and spring clamp with which said bolt is adjustably connected.

In testimony whereof I affix my signature.

LEONARD WILMOT MONTGOMERY.